US008162215B2

(12) United States Patent
Chaum

(10) Patent No.: US 8,162,215 B2
(45) Date of Patent: Apr. 24, 2012

(54) SCAN-INTEGRITY ELECTION SYSTEMS

(76) Inventor: David Chaum, Sherman Oaks, CA (US)

( * ) Notice: Subject to any disclaimer, the term of this patent is extended or adjusted under 35 U.S.C. 154(b) by 588 days.

(21) Appl. No.: 12/219,034

(22) Filed: Jul. 15, 2008

(65) Prior Publication Data

US 2008/0272194 A1 Nov. 6, 2008

Related U.S. Application Data

(63) Continuation-in-part of application No. 11/519,709, filed on Sep. 11, 2006, now Pat. No. 7,516,891, which is a continuation-in-part of application No. 10/348,547, filed on Jan. 21, 2003, now Pat. No. 7,210,617.

(60) Provisional application No. 60/716,215, filed on Sep. 12, 2005, provisional application No. 60/740,007, filed on Nov. 28, 2005, provisional application No. 60/740,131, filed on Nov. 28, 2005, provisional application No. 60/758,280, filed on Jan. 12, 2006, provisional application No. 60/788,412, filed on Mar. 30, 2006, provisional application No. 60/834,760, filed on Jul. 31, 2006, provisional application No. 60/358,109, filed on Feb. 20, 2002, provisional application No. 60/412,749, filed on Sep. 23, 2002.

(51) Int. Cl.
*G06K 17/00* (2006.01)
*G07C 13/00* (2006.01)

(52) U.S. Cl. .......................................... 235/386; 705/12

(58) Field of Classification Search .................. 235/386, 235/51, 56, 54 A; 705/12
See application file for complete search history.

(56) References Cited

U.S. PATENT DOCUMENTS 5,821,508 A * 10/1998 Willard ........................... 235/51
6,779,727 B2 * 8/2004 Warther .................. 235/462.01

* cited by examiner

*Primary Examiner* — Edwyn Labaze
(74) *Attorney, Agent, or Firm* — Clark & Brody

(57) ABSTRACT

A paper-ballot voting system is disclosed in which voters can retain symbols printed adjacent to the particular candidates or ballot question positions that they mark. Including ballot serial numbers on the forms allows voters to check online the symbols recorded for their ballots while maintaining ballot secrecy. In case of dispute, a physical resolution procedure lets voters establish whether the recorded symbols are correct with respect to the actual physical ballots. Some examples allow forms to be obtained online and voted by physical or facsimile delivery. Voters who cannot read ballots or cannot mark ballots can nevertheless vote while maintaining ballot secrecy. The overall integrity of the outcome is provided transparently.

5 Claims, 5 Drawing Sheets

Fig 1A
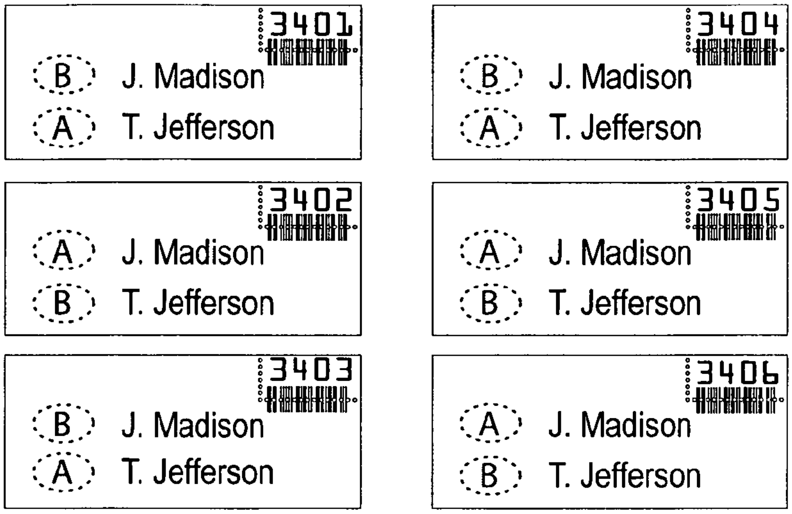
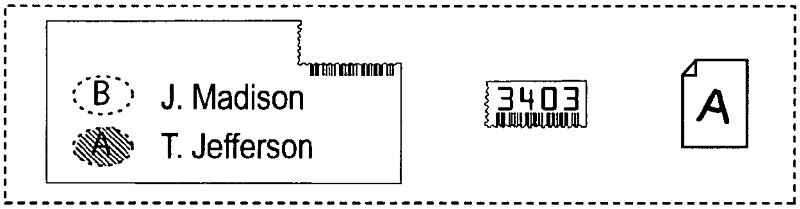
Fig 1B
Fig 1C
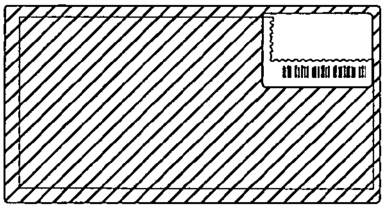
Fig 1D
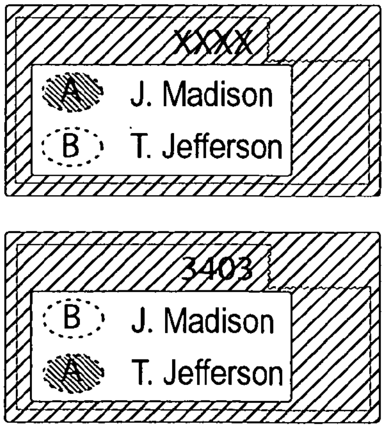
Fig 1E

SCAN-INTEGRITY ELECTION SYSTEMS

The present application is a continuation-in-part of patent application Ser. No. 11/519,709, filed Sep. 11, 2006, now U.S. Pat. No. 7,516,891 which claims priority from provisional application No. 60/716,215, filed Sep. 12, 2005, provisional application No. 60/740,007, filed Nov. 28, 2005, provisional application no. 60/740,131, filed Nov. 28, 2005, provisional application No. 60/758,280, filed Jan. 12, 2006, provisional application No. 60/788,412, filed Mar. 30, 2006, provisional application No. 60/834,760, filed Jul. 31, 2006, and which is a continuation-in-part of U.S. patent application Ser. No. 10/348,547, filed Jan. 21, 2003, now U.S. Pat. No. 7,210,617, which claims priority from provisional application No. 60/358,109, filed Feb. 20, 2002, and provisional application No. 60/412,749, filed Sep. 23, 2002, all of which incorporated by reference in their entirety.

FIELD OF THE INVENTION

The present invention relates generally to election systems including automated scanning of paper ballots systems, and more specifically to systems that provide integrity of outcome in such systems.

DESCRIPTION OF THE PRIOR ART

Voter-marked paper forms, the so-called "Australian" ballots introduced about one hundred and fifty years ago and sometimes credited with the introduction of ballot secrecy, rapidly dominated and remain an important part of public-sector elections today. Owing also to other uses of similar basic paper forms, for example in standardized testing, such ballots have become widely familiar among many voter populations. Election systems based on these forms are accepted in terms of the privacy and ballot secrecy that they provide, even though this protection is limited owing to involuntary and voluntary possibilities for voters to uniquely mark ballots. In terms of integrity of the election outcome, the overall inadequacy of many election systems based on such ballot forms is recognized. Automated scanning of paper ballots has become dominant in the United States, where it is typically conducted at polling places, and is spreading to other countries as well.

There are also trends towards comfort with online transactions. The notion of automated tracking, such as for packages, is gaining widespread acceptance generally apart from its use in elections. Also, the idea of downloading forms, printing them, and physically using them, for instance with such things as tickets, boarding passes and even voter registration, is gaining some acceptance.

Accordingly, objects of the present invention include: maintaining the familiar user interface of a single ballot form with direct marking adjacent to candidates or other selections; providing voters the ability to check that their votes are correctly included in the tally process, and providing for resolution of failed checks, all in a way that preserves the underlying ballot secrecy; offering the option of voters downloading ballot forms that can then be printed and provided physically or by facsimile; providing transparency of the integrity of the overall tally process; and allowing voters with disabilities to conveniently vote and check their votes.

The present invention aims, accordingly and among other things, to provide the above. Objects of the invention also include addressing all the above mentioned as well as generally providing secure, private, practical, robust, efficient, low-cost election systems. All manner of apparatus and methods to achieve any and all of the forgoing are also included among the objects of the present invention.

Other objects, features, and advantages of the present invention will be appreciated when the present description and appended claims are read in conjunction with the drawing figurers.

BRIEF DESCRIPTION OF THE DRAWINGS

FIG. 1 is a combination plan view and schematic depiction of an exemplary embodiment of the processes of an election in accordance with the teachings of the present invention.

SUMMARY OF THE INVENTION

Figure 2A:
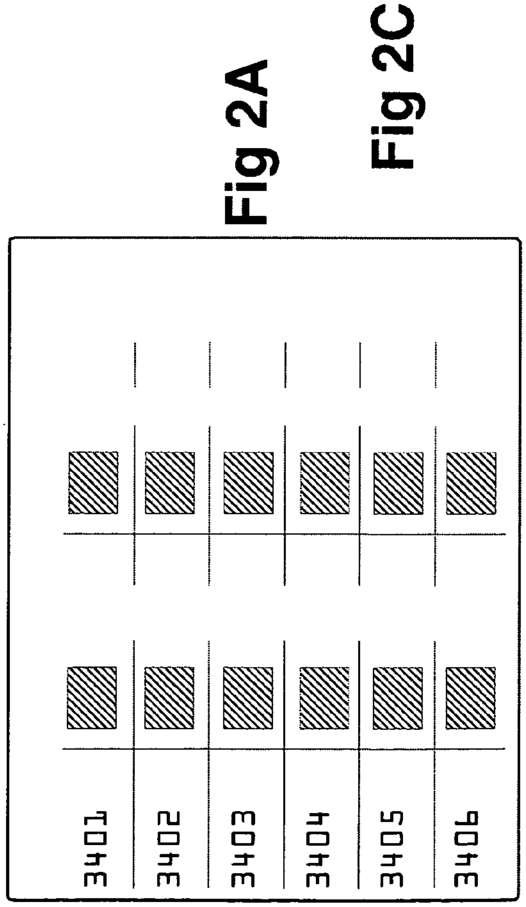
FIG. 2 is a combination state and cryptographic protocol diagram of an exemplary embodiment of an overall election system in accordance with the teachings of the present invention.

This section introduces some of the inventive concepts in a way that will readily be appreciated, but makes significant simplifications and omissions for clarity and should not be taken to limit their scope in any way; the next section presents a more general view.

In one aspect, where ballots are provided physical ballots, included on such a ballot form are code symbols associated with each position that the voter can mark. The ballots can generally be cast as usual with optical scan systems, such as by mail-in or in-person at polling places equipped with so-called "precinct scanners" or using ballot boxes and so-called "central scan." Voters unable to read ballots at a polling place can generally vote using headphones and a marking template or an assistant from whom the vote can be kept secret.

More specifically, voters who wish to audit their ballot make a note, such as on paper or by audio recording, of the code symbol associated with each position they mark. The information noted can later be used by voters or their designates, as will be explained, to verify whether their ballots were processed correctly. Voters still remain unable to convince other persons, at least those not connected with running the election, of how they voted.

After marking the ballot, the voter also tears off and keeps a counterfoil containing a serial number. Once the ballots are scanned, voters should be able to enter serial numbers for example on the election website or by telephone. The code symbols reported by the system responsive to a particular serial number entered by a voter should match those noted by that voter. When they do match, voters have verified that their votes are recorded correctly and that they should be correctly included in the tally. If even just a few percent of voters check in a significant-sized election, it is believed that a very effective overall audit can be provided as will be described.

If the letters do not match voter notes, however, voters can go to election headquarters in some examples and show the serial number counterfoil and point out where the notes and online system differ. The election officials should then locate the ballot with that serial number and let the voter see the part of the ballot where the counterfoil was detached. This can allow verification by the voter and observers, even at a forensic level, that the two pieces of paper were once one.

Since the election officials typically cannot be sure that the person with the counterfoil is the one who cast the corresponding ballot, and anyway in order to allow those such as party representatives and the press to observe the proceedings, the votes on the ballot are preferably not shown in a way that is linkable to that ballot. Instead, in order to show that the correct code symbol was posted the election officials expose only the particular contest proposed by the voter for checking. But before showing this, in order to hide how this one contest was voted, they preferably shuffle the ballot in among other ballots each exposing only a vote for a different candidate for that contest, but with the same code symbol.

Auditing the printing on ballots, that coded symbols and serial numbers correctly correspond with candidates, can be accomplished using unvoted ballots. The voter checks the ballot online and, if there is a discrepancy, the ballot is proof of improper printing. Voters may ask that a ballot supplied them at a polling place be spoilt and that another ballot be provided; voters who receive ballots by mail may also spoil them and still vote with another ballot.

Voters unable to read the ballots can be provided with a choice of audio recording to assist them. In some examples the recording instructs the voter how to mark the form using tactile "templates," as are known. In addition, the audio recording can provide the code symbols to the voter and the voter may utter those corresponding to positions voted so that they can be recorded for later checking by the voter. In other examples, the audio recording allows the voter to voice codes that can be recorded by an assistant who does not learn the vote and whose work can be checked based on an audio recording of the voter utterances. In still other examples, voters who can read the form but not mark can provide, based on their reading of the form, instructions to an assistant and those instructions can also be recorded. In all of these examples, the audio notes taken by the voter or instructions given by the voter are preferably coded and timed so that they do not reveal the votes cast to assistants or onlookers.

In a second aspect, ballots are provided as information instead of as a physical form. Examples include when voters receive ballots by email or through online transactions. The voter produces a paper ballot that preferably does not reveal the vote in the clear but rather transmits the vote through the corresponding coded symbols. The customary signed "affidavit" and mail or fax submission of the form are preferred options. Processing of the forms, once the affidavits are checked, is as with polling-place ballots.

With printed, audio or informational ballots, voters are preferably able to take an unvoted ballot (whether paper or audio ballot) from the polling place, or retain one in a vote by mail or online scenario, and check it against online data. Discrepancies are preferably verifiable owing to authentication associated with the ballot.

A variant publishes close-up scans of a small part of the serial number that reveal paper fiber patterns, as one way to make forgery of the counterfoils difficult.

Various aspects of the invention are described first more generally here, as will be appreciated, and then in more detailed exemplary embodiments later.

The symbols on the ballot can be generated depending on physical random sources, pseudorandom sources, cryptographic pseudorandom sources, algorithmically, or in whatever combination of these. The patterns on ballots may be unique per ballot or there may more than one ballot with the same pattern. Identifying ballots in the scanning process can use the code symbols as well as serial numbers. Having multiple ballots with the same pattern can allow that the serial number is the same.

The code symbols can be printed inside the region to be filled in marking and/or adjacent to it. The marking means in some embodiments cover the symbols, to provide improved ballot secrecy. Various marking paradigms are known and can be developed. For instance, "fill the oval" or "X in the square" or "check mark in the square" or complete the arrow are all well known.

In some examples the code symbols are chosen from known symbol sets with orderings and printed in order or in a cyclic permutation of a sequence from the ordering, it is believed for user convenience. However, other examples use symbols that may not be familiar and/or which have no known ordering and/or which are printed in an apparently random ordering. Code symbols can be unique per ballot, and thereby identify the ballot. For instance, pairs or triples of underlying symbols make up a larger symbol that is in effect from a very large alphabet.

Various dispute resolution aspects and procedures are anticipated. One example, detailed further below, uses physical forms, matching of chit fiber patterns and physical procedures to reveal codes without revealing votes. Another example, as would be understood, uses scanned images made by one or more parties and preferably committed to without being made public and/or one or more additional scans made to check the validity of disputes.

DETAILED DESCRIPTION OF PREFERRED EMBODIMENTS

Detailed descriptions are presented here sufficient to allow those of skill in the art to use the exemplary preferred embodiments of the inventive concepts.

An example aspect with physical distribution of ballots will now be described in detail with reference to FIGS. 1 and 2.

Turning now to FIG. 2, a combination state and cryptographic protocol diagram of an exemplary overall election system in accordance with the teachings of the present invention will now be described. An election will be described as proceeding through four phases: pre-voting, voting, pre-audit, and audit, each shown in a respective "bulletin board" snapshot, FIGS. 2A, 2B, 2C, and 2D, respectively. Referring to the first snapshot of the bulletin board, FIG. 2A, it will be appreciated that the bulletin board may substantially be considered a table with one row for each ballot serial number. (Only six rows are included in the small example illustrated for clarity, though extension to any number of rows would be readily understood.) The leftmost column includes serial numbers for each row and is shown in serial-number order. The other two columns in the example representation are each in a substantially "randomized" order. The hatched rectangles shown indicate so-called "commitments" as are well known in the cryptographic protocol art. Thus, each of the leftmost and middle columns includes commitments to values, some of which will be opened in later phases. Each of the second and third columns includes spaces where values will be written in later phases as will be explained. In particular, the rightmost column is only spaces and is where the results are to be written in.

Turning now to FIG. 1, a combination plan view and schematic depiction of an exemplary embodiment of the processes of an election in accordance with the teachings of the present invention will now be described in detail. FIGS. 1A through 1E show some example ballots, the voter voting process, the voter checking process, the serial-number matching process, and the code-symbol verification process, respectively.

Referring now to FIG. 1A, the six example ballots are shown in combination plan and schematic view. Each is identified by its unique "serial number" printed both for voter readability in Arabic and as a barcode that cuts across the perforation line for the separable counterfoil chit. Each ballot has the candidates listed in the identical order (for clarity and as is typical at least per polling place even with traditional so-called "ballot rotation" schemes). Each ballot also contains one mark position, shown as an oval, labeled with the letter "A" and another labeled "B." (The letters serving as "code symbols" in the examples can be arranged in or near the ovals or other locations where marks are to be made.) Those ballots with "A" labeling the first candidate and "B" the second may be considered "not swapped" and those ballots where the positions of the letters is interchanged are accordingly considered "swapped." An example reason, as will be appreciated, for the substantially random choice of whether each ballot is swapped or not is that the code symbols will be posted, as will be described, and should not reveal how the particular ballot serial number was voted. The printing on the ballots, and thus which are swapped, is preferably not revealed except to the corresponding voter as will be appreciated. During processing, those ballots that are swapped will be swapped one more time, making the resulting code symbol correctly correspond to the vote: "A" for the first candidate and "B" for the second. Those ballots that are not swapped will have their results reported without swapping in their processing. (There are two different cases that give a not swapped result: passed straight through without any swapping or swapped twice in succession.)

An example voting session by a voter is shown in a combination plan and schematic view in FIG. 1B. The voter receives the ballot with serial number "3403." The voter then votes for the second candidate by filling the second oval, a vote for Jefferson, as indicated. Then the voter uses the perforation to remove the counterfoil containing the serial number, which is the configuration shown. Also, the voter makes a note of the letter in the oval marked, in this case the letter "A," as indicated in a handwritten font. In some settings, as mentioned, ballots are scanned in at the polling place before the voter leaves. In other settings, after being cast by the voter, ballots are transported to a satellite or central processing location. With vote-by-mail, ballots are scanned in some jurisdictions as received and in others in a batch close to Election Day. The scan image contains at least the positions marked and optionally the corresponding associated code symbol, as well as the serial number from the barcode remaining on the ballot. So-called "OCR" (Optical Character Recognition) optionally provides a double check on the printing and serial number scanning, as the letters should match the data used in printing. The code symbols are posted in the row of the bulletin board that corresponds to the ballot serial number, as will be described.

Figure 2C:
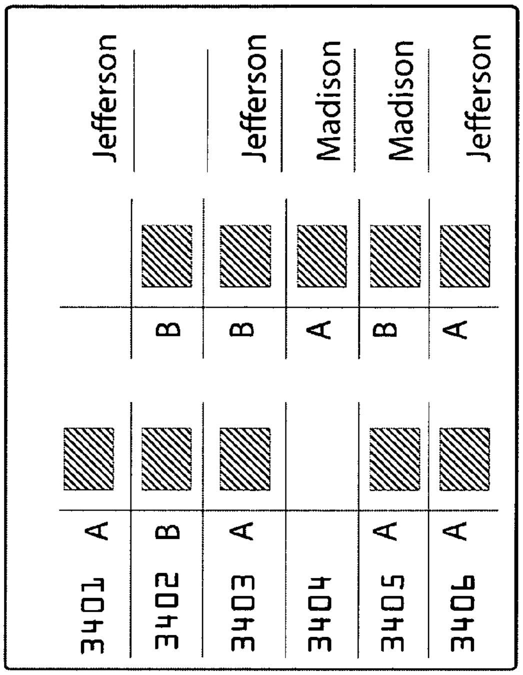
Figure 2B:
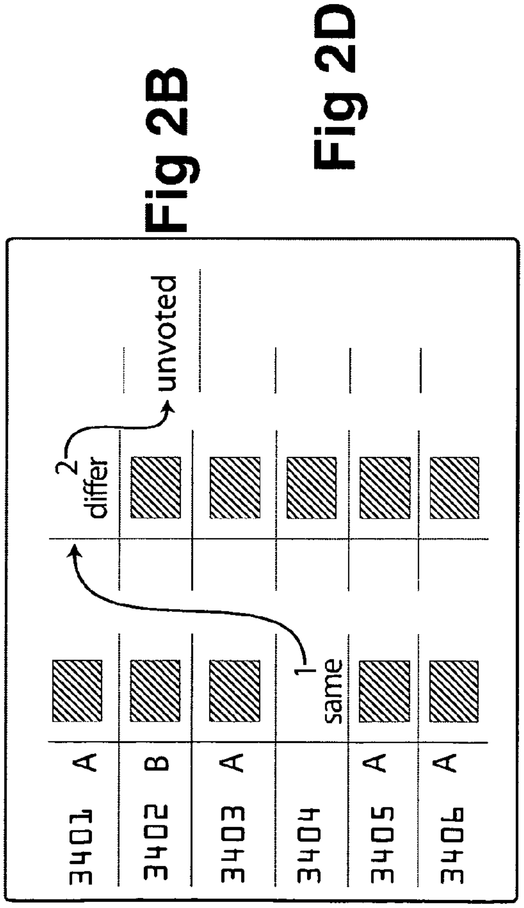

Referring now to FIG. 2B, the bulletin board is updated from the scanned information. In particular, the letter code symbols "A" or "B" are shown posted in a row corresponding to the serial number of the ballot on which the corresponding location was marked by the voter. These same code symbols are preferably made readily available to voters, such as by being served up by an election website or read out when the serial number is entered into a so-called "IVR" (Interactive Voice Response) system.

Still referring to FIG. 2B, what is referred to as a "print audit" of a ballot is also included. Once it is established that a ballot will not be voted, whether it was for instance spoilt at a polling place or not received in time by mail, the positions of its code symbols are revealed by "opening" commitments to corresponding values on the bulletin board. This is illustrated for the example ballot with serial number "3404." The commitment in the first column labeled by that serial number is opened and the row number so revealed points to the commitment in the second column that is also then opened. Once both commitments are opened they reveal whether the ballot should have been printed swapped or not swapped. If both revealed pre-commits contain the word "same" or both contain "differ," then the ballot should have been printed not swapped, "A" above "B." But if either one pre-commit has the word "same" and the other the word "differ," then of course the ballot should have been printed in a swapped order, "B" above "A." (The commitments are shown as posted on the bulletin board as described for the first phase with reference to FIG. 2A, but omitted for clarity from the subsequent bulletin board snapshots, FIGS. 2C and 2D, to be described.) Because which particular ballots would be print audited is preferably substantially unpredictable when the ballots were printed, and the commitments are opened through the publicly-observable process of publishing their keys, the procedure is believed to effectively establish that the ballots were printed according to the secrets committed to by the bulletin board. More specifically, it is believed to establish that with high probability for large elections that the pair of linked commitments corresponding to each ballot serial number contains a number of occurrences of "differ" and "same" consistent, as already described, with the printing of code symbols on the ballot of that serial number.

Referring now to FIG. 1C, the voter can check the code symbol. In the example, the voter enters the serial number, such as from the counterfoil kept by the voter, as shown shown. The code symbol next to candidates marked, in this case the letter "A" for the single contest of the example of ballot 3403, is rendered by a web browser (shown) or spoken by an automated voice (not shown for clarity). The voter checks that this letter matches that which the voter noted after marking.

In the exceptional situation that the voter believes that what was provided from the bulletin board by the system does not match the letter printed next to the position he or she marked, a physical audit of the ballot can be conducted.

Referring to FIG. 1D, the first part of an example dispute resolution procedure is shown. The voter initially provides the serial number from the counterfoil. Then those in charge of the ballots locate the corresponding ballot. For example, first they may find the bundle of ballots their database indicates the particular ballot serial number was in when scanned. Then they count down to the corresponding ballot or run that stack through a scanner programmed to kick out the particular number. Having located the ballot, they then place it in a special envelope that is opaque (as indicated by the hashing, which is partially transparent for clarity) except for a cutout window that exposes the serial number part. The voter can then, without any votes being exposed, match the counterfoil up with the ballot at the perforation line where they were separated. Such torn or cut paper matching can even be verified by known forensic techniques that rely on the pattern of fiber that makes up the paper. (Hand-held digital microscopes with the appropriate magnification and special oblique lighting are known for such document inspection purposes.)

Referring to FIG. 1E, the second and final part of the dispute resolution procedure is shown. The voter along with other observers are allowed to verify that the letter posted does in fact match the one for the position marked, preferably in a way that does not reveal the corresponding vote as. In a particular example approach, those in charge of the ballots transfer the ballot to an envelope that exposes both ovals of the disputed contest but not the serial number. Those observing the transfer can see that the ballot is not switched during the transfer, but cannot yet see the ovals, for instance because the transfer is conducted with the ballot face down. Another ballot is constructed, or borrowed from the actual ballot store, whose printing is of the opposite type, "not swapped" in the example, but which has the same letter, "A," marked. The second ballot is placed in an envelope of substantially identical appearance. The two envelopes are then preferably shuffled in a way that creates no doubt that the same two remain but that effectively hides which is which. An example device to facilitate this is a cylindrical box, like a musician's drum case, with a rotating platform in the base on which multiple radial vertical partitions are secured. This allows envelopes placed inside to be spun to unpredictable locations but also for the box to be opened for complete inspection. Whatever the process, it should clearly establish that the ballot must have had the particular letter next to the position marked, but which candidate the mark on the actual ballot corresponds to is not revealed to any onlooker since all mark positions are among those displayed.

Referring now to FIG. 2C, those running the election post the election results in the space provided in the rightmost column. It will be appreciated that the totals, or at least as claimed by those running the election, can be determined by adding up the number of occurrences of each candidate name posted. The intermediate symbols shown as letters in the middle column are used as part of the audit, as will be described.

The pre-audit values posted are determined by those running the election or their computers, in effect using knowledge of what is in the commitments. Thus they are able to in effect trace the symbol posted next to the serial number through the first envelope, which indicates whether or not it should be swapped (that is "A" changed for "B" and vice versa) or passed straight through and the row number in the middle column that it should land on. The pre-audit posting is completed by repeating this process using as input, instead of the letters in the first column, the intermediate letters now posted in the middle column. The resulting letters are placed in rows of the last column as called for by the row numbers in the commitments of the middle column—but these are shown translated to candidate names for clarity, "A" for Madison and "B" for Jefferson. Since these letters should be free of any swaps, those in printing and from the commitments having cancelled (because there are two or zero swaps in total for each ballot), these results letters correspond to the standard order that the candidate names are listed in on all the ballots. The letter "A" in the final column thus corresponds to a vote for Madison and the letter "B" a vote for Jefferson.

Figure 2D:
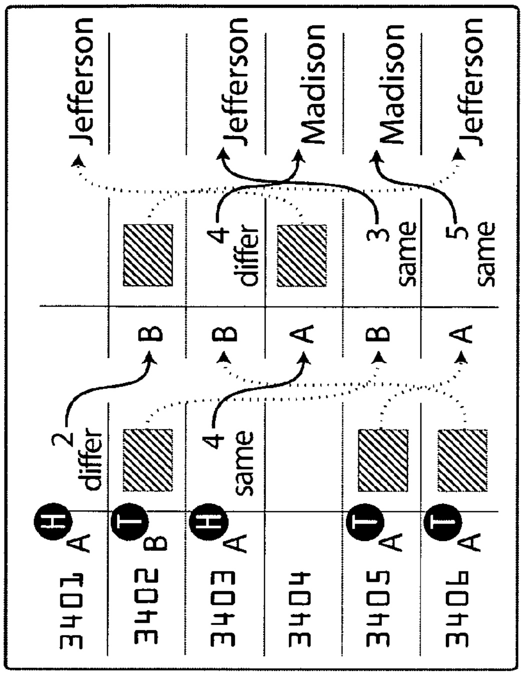

Referring now finally to FIG. 2D, described is how the bulletin board is used in conducting a public audit aimed at establishing that the results posted in its last column do in fact correspond to the letters posted in its first column. Since the code symbols of the first column are vetted by potential voter inspection as already described, the posted results are in effect at least spot-checked all the way back to what the voters saw when marking. The audit is also predicated on the ballots being printed consistently with the content of the commitments on the bulletin board, which was established using the unvoted ballots as also explained earlier with reference to FIG. 2B.

The final step of the audit is controlled by the unpredictable choice of a subset containing roughly half of the serial numbers. In practice, this is preferably a function of the results of indisputable public data, such as stock closing prices. For clarity here, however, it is shown as a publicly-witnessed coin toss associated with each voted serial number. Heads (shown as "H") means open the commitment and tails ("T") means leave it sealed. Particular rows in the second column of commitments are pointed to by the content of those commitments that are opened in the first column. That the symbols posted pre-audit in these pointed to rows are consistent with the commitment content is readily verified: the pointer is followed and the two letters indicated should match if the commitment contained "same" and they should differ if it contained "differ." (For concreteness and clarity the pointers in commitments not opened are as will be appreciated shown as dotted lines.) None of the commitments in these pointed-to rows of the middle column should ever be opened, as each would provide a complete link from a serial number to a vote. But all of the other commits in the middle column are opened as shown. Their consistency with the pre-audit postings is then checked as with the first column of commits: the two letters connected by a pointer from an opened commit should be the same if the content is "same" and differ if it is "differ."

The system naturally extends to incorporate any number of candidates, contests and ballot styles, as would be readily understood. For example, a "vote one out of four" contest could use the letters "A," "B, "C" and "D" in that order except that each contest on each ballot starts with a random one of the four letters and the letter sequence wraps around as needed, with "A" following "D." For contests that allow more than one position to be filled, such as so-called "M out of N" voting the code symbols are preferably permuted instead of simply cyclically shifted. So-called cumulative voting would have one column of mark positions for each possible vote for a candidate. Similarly, so-called "rank order" voting would use one column of mark positions for each rank. What may be called "contest partitioning" allows each collection of contests to be processed using separate commitments, resulting in a division of the ballot that hides patterns of votes that extend over the divisions. When more than one contest is on the ballot, each has independently chosen starting letters and the single letters shown on the bulletin board and in its commits are replaced by lists of letters, one for each contest. A separate bulletin board is optionally in effect used for each polling place or other elementary unit with a unique combination of contests making up its so-called "ballot style." The serial number of ballots can be extended so that a unique prefix or range can be employed for each ballot style.

Figure 3A:
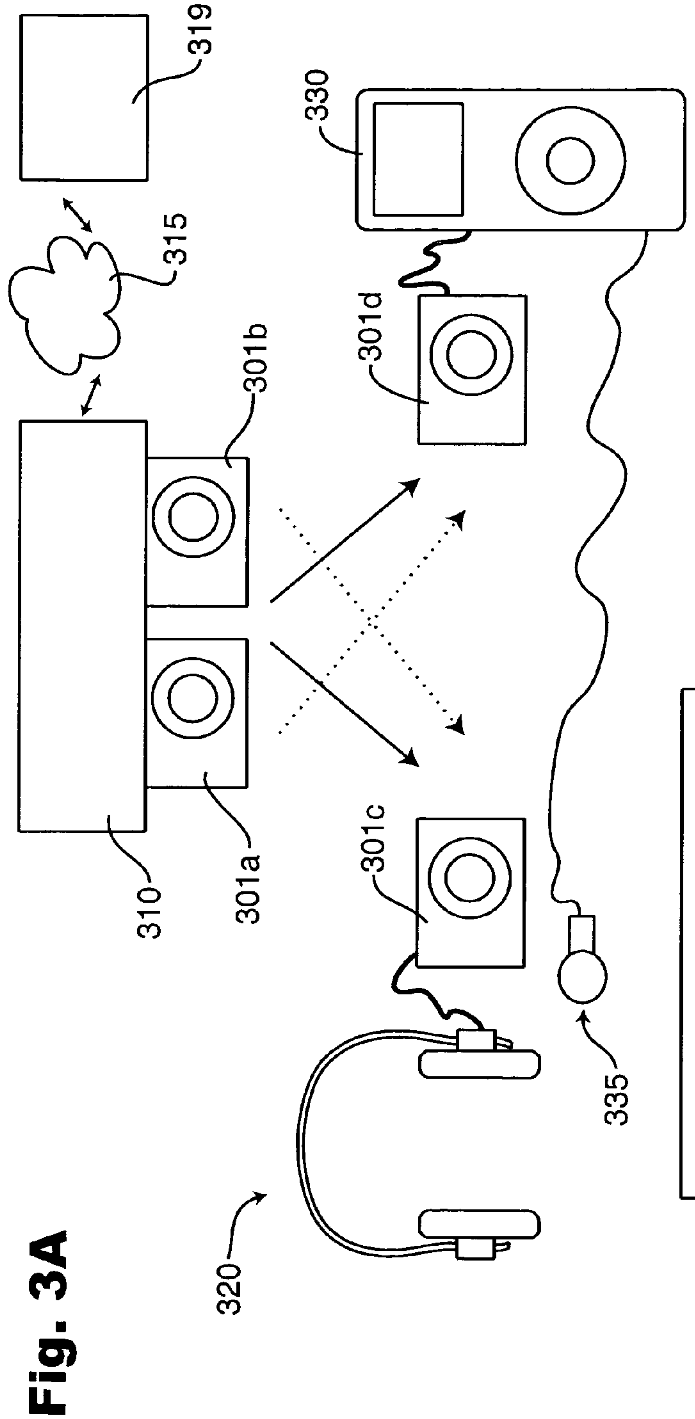
FIG. 3 is a combination block, schematic, flow, and plan view of an exemplary system to accommodate voters with various disabilities in accordance with the teachings of the invention.
Figure 3B:
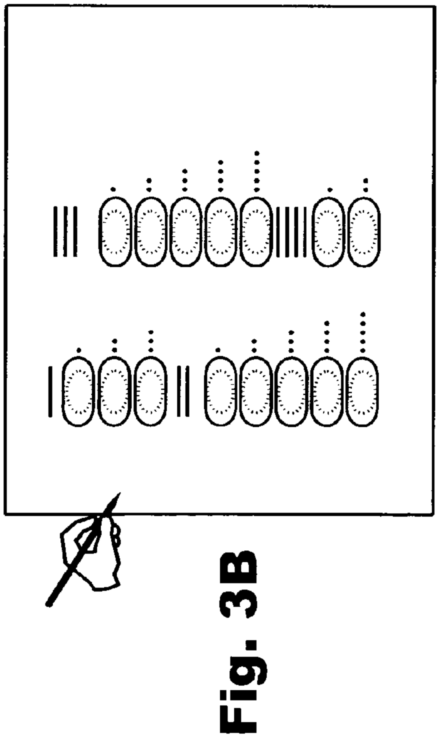
Figure 3C:
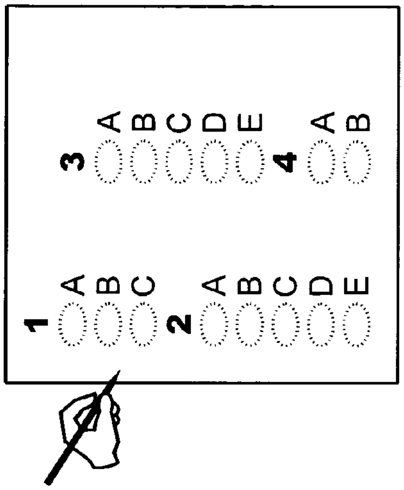

Turning now to FIG. 3, a combination block, schematic, flow, and plan view of an exemplary system to accommodate voters with various disabilities in accordance with the teachings of the invention will be described. FIG. 3A shows configurations for the equipment and its use, whereas FIGS. 3B and 3C show example templates and ballots. One obvious type of solution for voters with some disabilities, not shown for clarity, is an automated ballot marking device, where voters enter their votes by whatever means and the device marks a pre-printed ballot for them. An inventive extension to such a device suitable for the present approach includes the capability to provide the code symbols to the voter, such as in a printout or audio form, whether by OCR reading or by consulting a database, although not shown for clarity.

Referring now to FIG. 3A, voters that are unable to read the ballot, such as illiterate voters or those with visual disabilities, in effect choose between two audio ballots. Some approaches for this, previously disclosed by the present applicant, include passive recording media, hidden connection settings, and decrypting headphones. All of these approaches are believed applicable in the present setting. The approach described here, however, comprises a choice between multiple audio players in a preferred exemplary embodiment.

The voter chooses between two players, 301*a* and 301*b* offered by those running the election. According to a first choice scenario, the solid arrows are followed and players 301 stay on their respective sides: 301*a* becomes 301*c* and 301*b* becomes 301*d*. According to a second choice scenario, the dotted arrows shown are followed and players 301 switch sides: 301*a* becomes also 301*d* and 301*b* becomes also 301*c*. Players 301 contain recordings for the particular series of coded symbols and candidates or questions the voter is to listen to in the voting booth. Players not chosen may optionally be played out and recorded on one or more instances of equipment 330 supplied by the voter or observers. The voter listens to the audio on 301*c* through headphones 320.

The programming of players 301 is shown for completeness, though they may be pre-programmed in a particular setting. A combination charging and/or programming station 310 is shown holding the devices and optionally charging them and/or storing programming material into them. The material may be developed by the device 310, stored by it in a master storage from which individual programs are to be taken, and/or obtained or developed in cooperation with one or more other devices such as 319 shown communicating with 310 over network 315.

Referring now to FIG. 3B, the voter in this exemplary embodiment is able to find the oval positions to mark using a so-called "tactile template" as is known in the art. The audio in this example preferably lists the candidates in the order in which the ovals appear. Preferably the contest numbers and oval numbers are called out in the recording, optionally in a different voice from that used for the code symbols. The contest numbers are shown in the example by preferably raised bars and the position numbers within a contest by preferably raised dots. Marks can be made through the openings in the template, shown as capsule shaped, through to the paper form shown below with its dotted-line ovals and code symbols. The voter ends up preferably marking a ballot form according to the present invention and accordingly produces a ballot that is substantially indistinguishable from those marked by most other voters.

Referring finally to FIG. 3C, an example embodiment is shown in which the voter does not mark but informs an assistant of where to mark. Such an approach has been described in detail elsewhere in reference to media, switches, and encrypting headphones as already mentioned. In the present example, however, the audio the voter hears is preferably, within contests, in order of the code symbols. The order of the contest may be standard or selectable by the voter through the interface of audio device 301*c*.

If the candidates were to be read in a standard known order, timing would reveal the voter's vote. In one example, within each contest the names of candidates (or ballot question titles, or the like) are read starting from that labeled by the first symbol in its standard or lexicographic order. For instance, if the candidates are labeled by code symbols beginning with "A," the candidate that is labeled by "A" is read first, that labeled by "B" second, and so forth. The voter indicates the contest and the symbols to be written by the assistant. The ballot can then be as shown or, for instance, a list of contest numbers each with its corresponding code symbol.

A universal form with maximal number of candidates per contest is anticipated. The serial number associated with the particular recording is preferably associated with whatever ballot form, such as by being written or filled in as a pattern of ovals, as will be understood and not shown for clarity. In another example embodiment, however, a standard ballot, not shown for clarity, is used in which only the serial number is changed. For instance, the assistant crosses out the originally printed serial number and records the one read by the voter or visible on the portable player 301*c*. One example way to record a serial number is by filling a pattern of ovals that encodes it digit by digit.

In other examples, the candidate names are read in a standard order but starting from a randomly chosen one of the candidates and wrapping around in a cycle. In still other examples, random delays are inserted into the program to keep the candidate identity from being revealed by the timing and the candidates can be read in standard order. In yet still other examples, voter input determines the order, such as a mandatory selection of candidate number by the voter, and timing can thus be kept from revealing the candidate.

In still another example embodiment, voters may be able to read and speak but have disabilities that make it difficult for them to mark using the standard means offered. One solution is to allow and/or provide special marking means, such as are known and operable by such voters. Another example is for the voter to read the symbols shown on the ballot and to then speak them so that they can be recorded by an assistant, such as using the types of forms already described with reference to FIG. 3C.

In embodiments where the voter utters symbols so that they can be heard by an assistant who marks, it is anticipate that a voice recorder 335 or the like is allowed to be operated. This recording then provides a kind of record and evidence of the symbols called out by the voter. Once the symbols are posted online the voter preferably has the option to listen to the recording and cross check it against the symbols online. Also, the voter optionally posts the recording, and others can perform the cross check, including by automated cross-checking being anticipated.

The device or devices not chosen by the voter contain audio that the voter and/or observer(s) are able to retain and in effect perform the equivalent of a "print audit" on. It preferably includes authentication, such as a digital signatures encoded in an audio watermark or other know means such as DTMF tones. Such authentication is preferably included in all the recordings the voter is able to choose between. This audio is preferably posted online and the voter and/or others check it or cross check it, such as already described and/or using the authenticator.

An example aspect with online ballot supply will now be described in detail with reference to FIGS. 4 and 5.

Turning first to FIG. 4, a combination schematic and plan view of an exemplary system for partly online voting in accordance with the teachings of the invention will be described. Initially the view of the ballot is rendered on a display device, shown as a typical screen, in FIGS. 4A-4D. Then it is printed, in some examples, as shown in FIG. 4D.

Figure 4A:
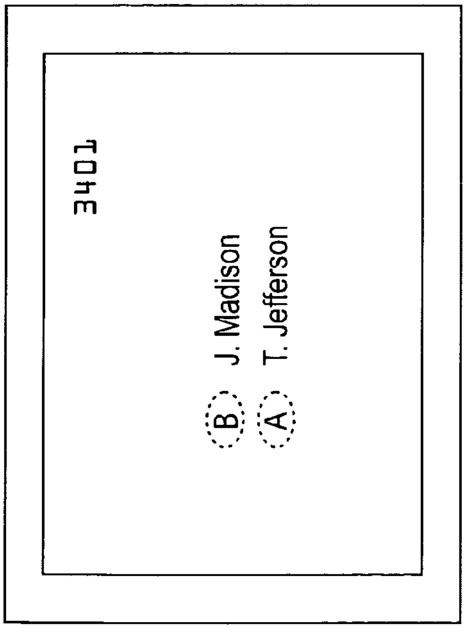
FIG. 4 is a combination schematic and plan view of an exemplary system for partly online voting in accordance with the teachings of the invention.

Referring to FIG. 4A, the ballot choices are shown presented to the voter in whatever convenient way, in one example as a depiction of a paper ballot. The voter is to make a selection, such as using a touch screen, pointing device, or whatever machine interface is suitable.

Figure 4B:
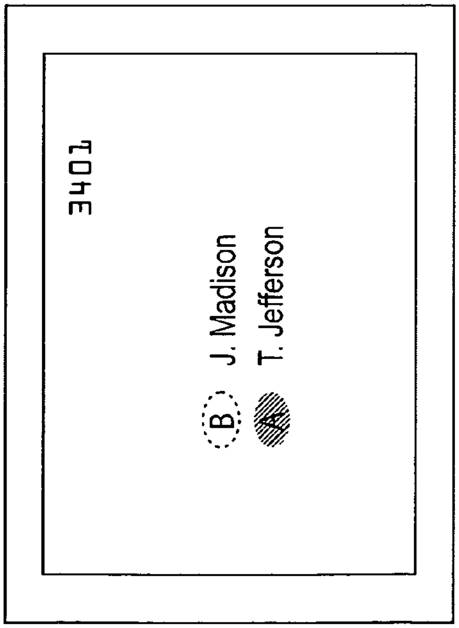

Referring to FIG. 4B, the rendering is preferably changed to reflect the selection of the user. In the example, the paper ballot paradigm is carried into the virtual. Other examples not shown for clarity are oriented toward the particular user interface paradigm.

Figure 4C:
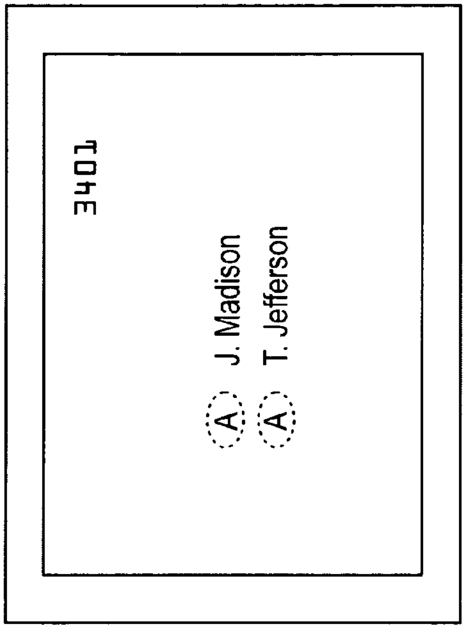

Referring to FIG. 4C, the rendering is preferably changed at a certain point, whether skipping the intermediate view of FIG. 4B or not, to include the code symbol for the position selected and not for the other positions. The letter "A" has been copied to all the ovals. In other examples a single letter "A" would be shown, optionally even replacing the candidate names and the like.

Figure 4D:
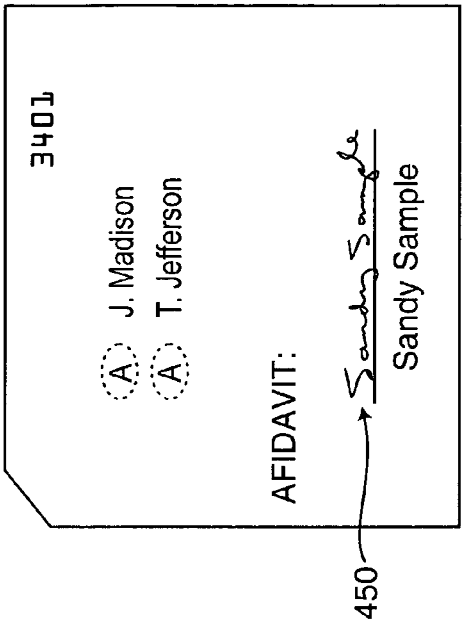

Referring to FIG. 4D, the ballot shown in FIG. 4C is shown printed and a so-called "affidavit" is shown included. In the example, the affidavit only includes the name of the voter and signature 450. In other examples, not shown for clarity, other information such as date, address and witnesses can be included. In some cases the affidavit is contained on a separate sheet or as part of an envelope.

Figure 5A:
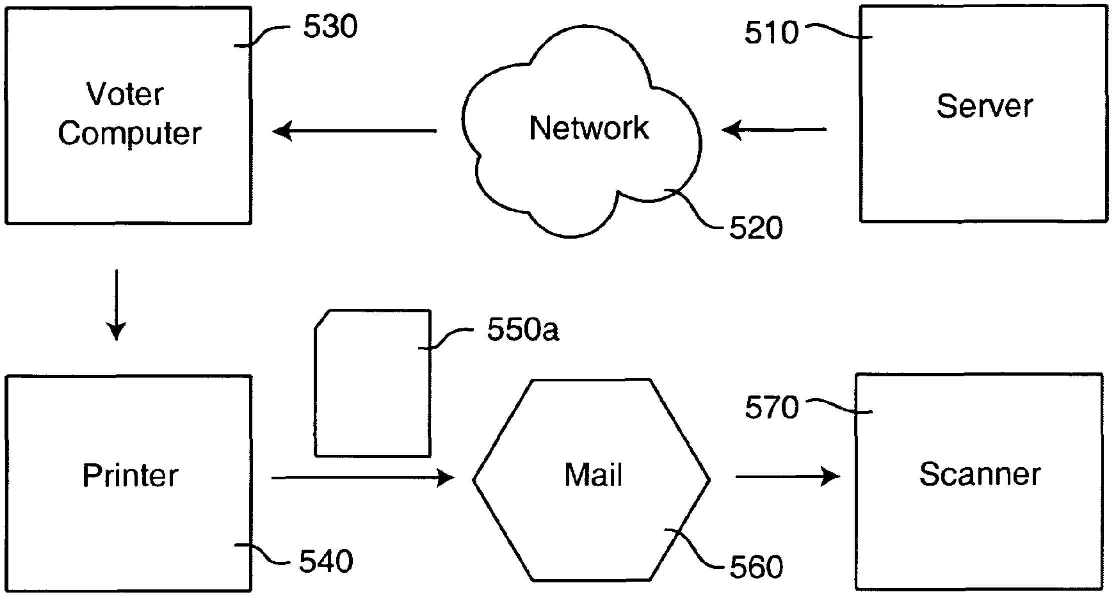
FIG. 5 is a combination block, schematic and protocol diagram of an exemplary system for partly online voting in accordance with the teachings of the invention.
Figure 5B:
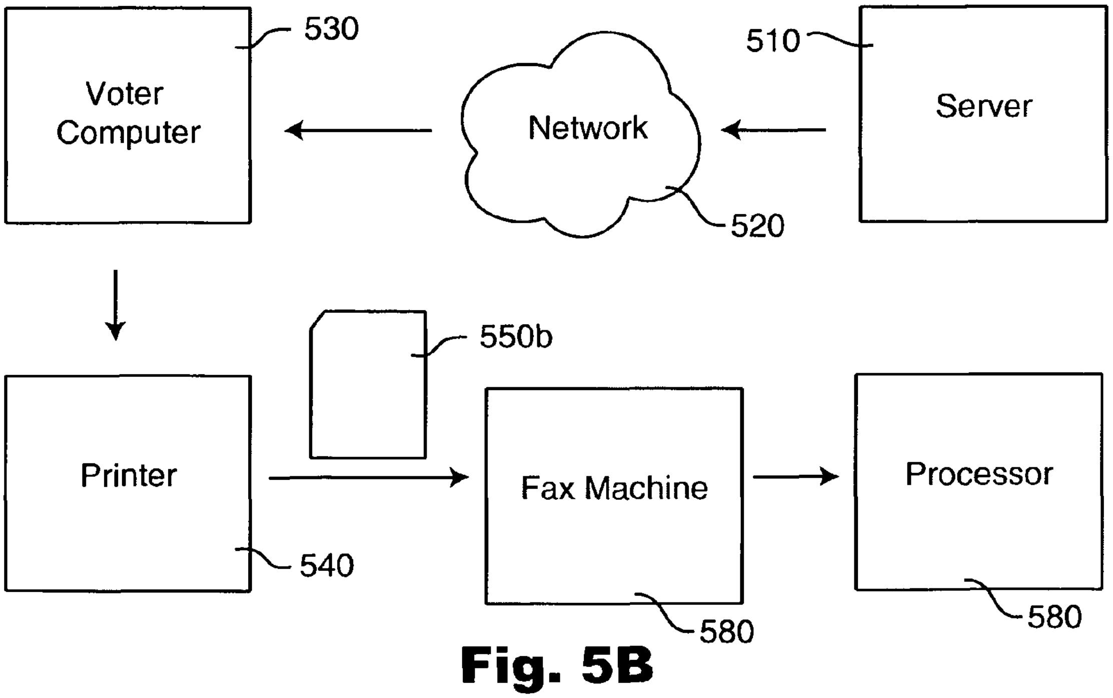

Turning finally to FIG. 5, a combination block, schematic and protocol diagram of an exemplary system for partly online voting in accordance with the teachings of the invention will be described. Two examples are shown, the one of FIG. 5A involving filling the form digitally, printing, and physical delivery and that of FIG. 5B involving digital filling, printing, and delivery by facsimile.

With reference first to FIG. 5A, server 510 initially sends ballots in digital form over communication network 520 to voter computer 530. For instance, such sending can be by so-called "email," web, portable telephone, or whatever online systems and combinations. Online voter authentication, as is known, optionally is combined with the ballot issuing process. The voter computer, whatever its form factor, allows the voting as already described with reference to FIG. 4.

The ballot form may be represented digitally in a variety of ways when traveling over network 520, as will be understood by those of skill in the art. One example that may be preferred in certain settings is as a so-called "active" or "fillable" form and even containing Java script or other code elements. Such an active form can be processed by the voter computer 530, preferably using off the shelf software for such purposes, for instance Adobe Acrobat Reader. The transitions between rendering states such as those shown in FIG. 4A through FIG. 4D, is then preferably made by scripting within the document. For instance, buttons or the like are provided on the form to allow the voter to move the form or a portion of it between rendering states.

In some examples, not shown for clarity, the voter may use more than one computer to collect and/or check and/or vote the ballot. Once voted, a voter computer, such as computer 530, is used by the voter to print the ballot shown in FIG. 4C to produce the ballot of FIG. 4D (the signature and other data on the form may be printed and/or written by hand).

Printer 540 is used to print the ballot, under control of voter computer 530. The result is shown as the printed ballot 550*a*. The printing of the form and its optionally further filling by the voter has been described with reference to FIG. 4D. This paper ballot is communicated in the example by physical delivery, shown as mail forwarding 560 to scanner 570 presumably operated on behalf of those running the election. In some examples the printer is part of the election site and in some examples the delivery from printer to scanner is by hand and in some examples a ballot box is an intermediary between printer 540 and scanner 570.

With reference finally to FIG. 5B, the components comprising server 510, network 520, voter computer 530 and printer 540 are substantially as already described with reference to FIG. 5A. Also ballot form 550*b* may be similar to form 550*a* already described with reference to FIG. 5A, though the affidavit would typically not be on an envelope but preferably on the ballot or an additional page.

Fax machine 580 is used instead of the postal mail or hand delivery of FIG. 5A to get the ballot image to processor 580 that is presumably under control of those running the election.

All manner of variations, modifications, equivalents, substitutions, simplifications, extensions, and so forth can readily be conceived relative to the present inventions by those of ordinary skill in the art. One example, as will be appreciated, is where ultraviolet ink allows voters to read the serial number on the ballot form with a special light but does not allow poll-workers or those engaged in recounting the paper ballots to see the serial numbers.

While these descriptions of the present invention have been given as examples, it will be appreciated by those of ordinary skill in the art that various modifications, alternate configurations and equivalents may be employed without departing from the spirit and scope of the present invention.

What is claimed is:

1. A ballot form method comprising providing a single sheet of paper having distinct symbols pre-printed adjacent to distinct positions within at least one contest, the distinct positions to be selected among by a voter, and permitting a voter to make a selection by marking the form adjacent to the distinct positions in pre-arranged locations and the distinct symbols varying substantially unpredictably per ballot form and the ballot form including identifier information identifying at least unique ballots.

2. The method of claim 1, further comprising publishing coded votes and commitments, and opening the commitments so that the voters can check substantially that their codes were correctly recorded and included in the final tally.

3. The method of claim 1, wherein a dispute resolution procedure is provided in which a voter is able to establish the symbol that they saw next to the position within a contest that they marked.

4. The method of claim 3, wherein separated edges of a form and a counterfoil are matched so as to establish that the two were once one and establishing which symbols are on the form.

5. The method of claim 4, wherein a ballot is shown in among multiple ballots that have been marked with the same symbol.

* * * * *